United States Patent

Shimada et al.

[11] Patent Number: 5,239,248
[45] Date of Patent: Aug. 24, 1993

[54] SERVO CONTROL SYSTEM

[75] Inventors: Akira Shimada; Norio Yokoshima, both of Tokyo, Japan

[73] Assignee: Seiko Instruments Inc., Japan

[21] Appl. No.: 822,341

[22] Filed: Jan. 17, 1992

[30] Foreign Application Priority Data

Jan. 23, 1991 [JP] Japan .................................. 3-006560
Jan. 23, 1991 [JP] Japan .................................. 3-006565

[51] Int. Cl.$^5$ ............................................. G05B 19/19
[52] U.S. Cl. .......................... 318/568.12; 318/568.18; 318/568.2
[58] Field of Search .................. 318/560, 567, 568.12, 318/568.18, 568.2, 611, 623, 625, 636; 901/9, 14, 19, 20, 23

[56] References Cited

U.S. PATENT DOCUMENTS

| | | | |
|---|---|---|---|
| 4,469,993 | 9/1984 | Swanson et al. | 318/561 |
| 4,542,471 | 9/1985 | Inaba et al. | 364/513 |
| 4,851,754 | 7/1989 | Sakamoto et al. | 318/616 |
| 4,888,536 | 12/1989 | Sakai et al. | 318/592 |
| 4,985,668 | 1/1991 | Nakazumi et al. | 318/568.2 |
| 5,063,335 | 11/1991 | Baechtel et al. | 318/609 |

*Primary Examiner*—Bentsu Ro
*Attorney, Agent, or Firm*—Bruce L. Adams; Van C. Wilks

[57] ABSTRACT

A servo control system effects control of a control object directly from an arbitrary stop position to a target position smoothly and safely. The servo control system has a detector for detecting an absolute position of the control object, and an observer for observing state values such as the position and/or velocity of the control object and a disturbance applied to the control object so as to servo-control the control object. The servo control system calculates initial state values of the observer determined according to the stop or rest position of the control object at the start of the operation so that the initial values are utilized for calculation of the state values by the observer. The observer calculates the state values and estimated values according to an algorithm at one sample preceding period, thereby enabling computation suitable to digital processing by the sampling mode operation.

2 Claims, 5 Drawing Sheets

SERVO CONTROL SYSTEM

BACKGROUND OF THE INVENTION

The present invention relates to a servo control system such as an industrial robot system, and particularly relates to the servo control system utilizing an observer for calculating a state value.

The servo control is adopted in various types of control systems which utilize a servo motor to control object actuator such as industrial robot, working machine, plotter and automatic assembler. Generally, the control system is constructed on the basic concepts of "Controllability" and "Observability". In order to effect the servo control, a pole of the controllable object is appropriately set by feeding back all of the state values. However, all of the state values may not be directly detected in some types of control systems. In constructing such control system, an observer can be utilized when the state value is observable. The observer can estimate the state value according to a detected signal so that the estimated state value is fed back to control the system.

In the conventional servo control system utilizing an observer, the control object is provisionally placed in a given origin position when starting the system. The observer calculates the state value with reference to the origin position.

On the other hand, when using a specific sensor such as an absolute type encoder having a function to detect an absolute position, a present stop position of the control object can be detected on restart of the control system. Therefore, in view of the reduction in operating time, it might be desirable to drive the control object to a target position directly from the stop position without returning the control object to the origin position. However, as described above, the conventional observer is constructed to calculate the state value with reference to the state where the control object is placed in the origin position. Stated otherwise, the initial state value is always set to zero so as to calculate a subsequent state value. Therefore, in the conventional observer, there would be considerable difference in the state value calculation between the origin position reference and the stop position reference. If the object were controlled according to the calculation of the state value using the stop position reference, there would result a drawback that dynamic performance of the control system would be seriously unstabilized in the initial state. Specifically, the control object would be seriously vibrated through an actuator, or an excess torque would be applied to the control object, or, even worse, the control object would be displaced in an unexpected direction so as to collide with an adjacent mechanism.

Therefore, the conventional servo control system utilizing an observer has the drawback that the control object cannot be driven safely from a given stop position.

SUMMARY OF THE INVENTION

Accordingly, a first object of the invention is to provide an improved servo control system utilizing an observer constructed to safely drive the control object to a target position directly from a given stop position. In order to achieve the first object, according to the invention, there is provided means for calculating an initial state value for the observer when starting the servo control system. The observer is constructed to operate based on the calculated initial state value to estimate a subsequent state value. Namely, the inventive servo control system is comprised of detecting means for detecting an absolute position of a control object, means for driving the control object according to a drive command applied thereto, an observer for estimating a state value based on detected results from the detecting means and the drive command, servo control means operative according to a control command indicative of a target position, the detected absolute position and the estimated state value to calculate the drive command effective to enable the driving means to drive the control object to the target position, and calculating means operative when starting the servo control system for calculating an initial state value for the observer according to an initial position of the control object.

In operation, when starting the servo control system, the calculating means is activated to calculate the initial state value for the observer according to the initial absolute position of the control object. The calculated initial state value is fed to the observer. After calculating the initial state value, the servo control system is operated so that the observer estimates a subsequent state value using the calculated initial state value. The servo control means operates based on the state value from the observer, the detected position from the detecting means and the given target position so as to compute the control command effective to control the object through the driving means. As described above, even in the initial state, the initial state value is calculated for a given stop or rest position of the control object so that the observer can estimate accurately a subsequent state value of the control object so as to control the object according to the estimated state value indicative of the instant state of the control object. Consequently, the control object is prevented from being subject to unstable operation.

The below description illustrates an additional aspect of the invention. Generally, there may be caused a disturbance such as an unexpected external force and a variation in an acceleration torque generated due to coulomb friction, elasticity, viscosity, load shift and so on in the movement of a control object such as a working machine and an industrial robot, which performs mechanical operations. Such disturbance hinders dynamic performance of the control object to thereby necessitate compensation therefor. Since the varying disturbance cannot be measured directly, an observer is normally utilized to observe or estimate a disturbance torque so as to effect disturbance compensation in the control system, as described earlier. Further, it is known that control performance can be improved by detecting a kinematic velocity of the object so as to undergo a feedback control. Therefore, some known control systems are constructed such that a disturbance torque is treated as a part of the control object model. The disturbance torque is observed using a drive current or torque generated by an actuator and a kinematic velocity of the control object to feed back the observed disturbance torque to a velocity control loop to perform object control. It is necessary to accurately detect velocity of the control object in the servo control system having the velocity control loop. However, practically, a system of a relatively small size such as a working machine is provided with a position detecting means, but is not normally provided with a velocity detecting means such as a tachometer in view of the desire to achieve a reduction in dimension, weight and cost. It is particularly difficult to adopt a highly accurate velocity detector because it is expensive.

Therefore, conventionally, position data from the position detecting means is differentiated to produce velocity data in the above mentioned control system, instead of using a solid velocity detector. However, when an analog circuit is utilized to differentiate a position signal to calculate a velocity, a high frequency noise may be contained, thereby practically hindering the required accuracy of the control system.

On the other hand, when a pulse encoder is utilized as a position detector, a velocity detecting device is accomplished by producing a voltage proportional to a frequency of pulses from the encoder. However, such voltage signal contains a ripple in a relatively low velocity range, thereby causing a reduction in accuracy. Normally, a low-pass filter is inserted to eliminate such ripple. However, addition of the low pass filter adversely causes a delay of a filtered signal, thereby degrading control performance of the system.

Further, the observer is typically constructed to execute digital processing each sampling period using a microcomputer so as to estimate a state value. However, in the conventional observer operation, the sampling period and the state value computation timing are not matched well with each other, thereby hindering efficient processing of the observation.

Accordingly, a second object of the invention is to accurately estimate the velocity of the control object so as to perform velocity control based on the estimated velocity data in the digital servo control system utilizing the observer, and further to construct an improved digital servo control system having a modified observer operative to perform the state value calculation suitably in digital signal processing of the sampling mode. In order to achieve the second object, the inventive digital servo control system is provided with an observer for use in observation of the disturbance torque to effect disturbance compensation control. The observer is also utilized to accurately estimate the velocity of a control object to effect velocity control based on the estimated or observed velocity data. Further, computation of the state values in the form of estimated disturbance and estimated velocity is efficiently executed in matching with a sampling period, as well as related computation of estimated output for use in computation of these state values.

The inventive servo control system is comprised of detecting means for detecting a position of a control object, driving means for driving the control object according to a drive command applied thereto, an observer operative based on the detected position from the detecting means and the drive command for performing digital processing to calculate state values in the form of an estimated velocity and an estimated disturbance, and servo control means operative based on a given target position, the detected position of the control object, the estimated velocity and the estimated disturbance to calculate the control command effective to enable the driving means to drive the control object to the target position, wherein the observer includes an estimated value calculating unit and a state value calculating unit which are responsive to a given sampling period and are operative based on an algorithm of a preceding sampling so that the observer calculates the state values in and estimated values each sampling period.

In operation, the inventive servo control system includes a velocity control loop, and data calculated by the observer is utilized as a velocity feedback signal of the velocity control loop. The observer estimates the velocity according to a drive torque applied to the control object or a drive current applied to the drive means, and a position signal of the control object. Further, the observer which calculates estimated values and state values is constructed such as to operate in synchronization with a given digital sampling period so as to appropriately calculate the state values and the estimated values.

DETAILED DESCRIPTION OF THE EMBODIMENTS

Figure 1:
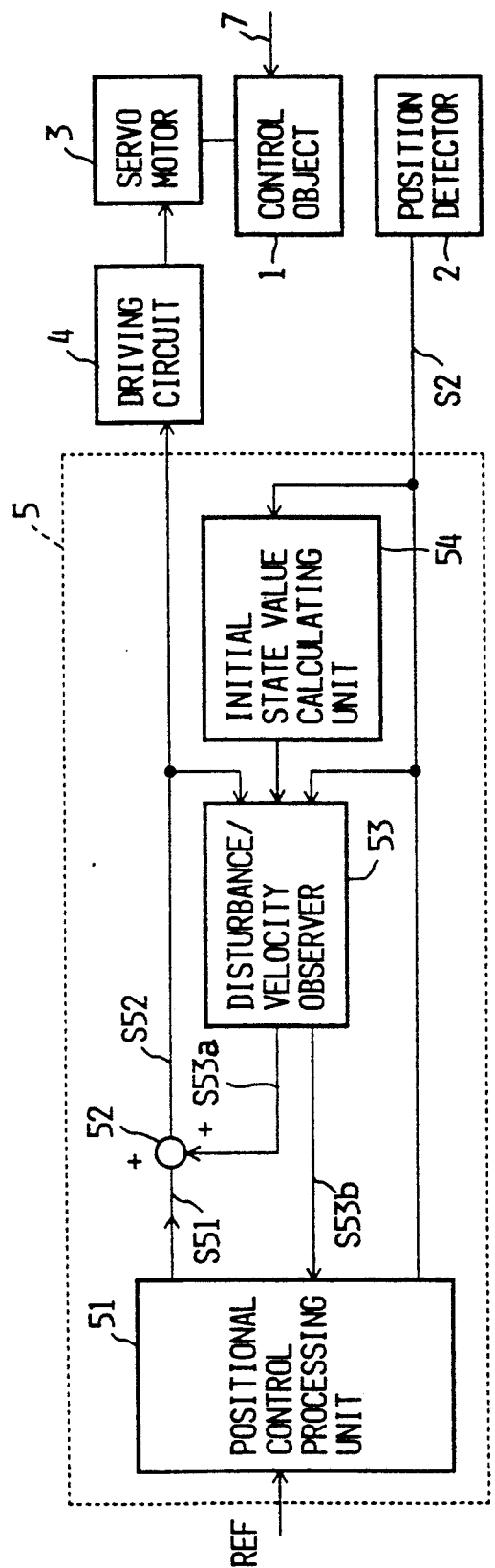
FIG. 1 is a block diagram showing one embodiment of the inventive servo control system.

FIG. 1 shows one embodiment of the inventive digital servo control system in the form of an industrial robot system. The FIG. 1 digital servo control system is comprised of a control object 1 in the form of a robot arm, an absolute position detector 2 in the form of an absolute type encoder for detecting an absolute angular position of the control object 1, a driving means in the form of a servo motor 3 for driving the control object, a driving circuit 4 for supplying a drive current to the servo motor 3, and a digital servo control device 5.

The digital servo control device 5 is comprised, as shown in the figure, of a positional control processing unit 51, a signal adder 52, a disturbance/velocity observer 53, and an initial state value calculating unit 54. In this embodiment, the digital servo control device 5 is composed of a microcomputer or a microprocessor.

The absolute position detector 2 composed of the absolute type encoder is constructed to output not only incremental position data or relative position data, but also an instant or current position of the control object 1. Accordingly, when the control object 1 is stopped at a given position, the position detector 2 can produce an output directly indicative of the instant stop position of the control object 1 without restoring the control object 1 to an origin position.

The control object 1 and the servo motor 3 or actuator are mechanically coupled with each other. The control object 1 receives a disturbance load 7 in the form of a frictional force, an elastic force and a coupled torque occurring in joint axes of the control object 1. Since the disturbance load 7 causes degradation of dynamic performance of the control object 1, compensation is carried out for the disturbance load 7. However, this disturbance load 7 varies and is not directly detected, and hence the disturbance/velocity observer 53 calculates an estimated disturbance torque to produce a corresponding signal S53a with reference to an absolute position data S2 from the position detector 2 and a drive command signal S52 from the signal adder 52, so that the estimated disturbance torque signal S53a is fed back to signal adder 52 to effect the compensation for the actual disturbance load 7.

Further, velocity feedback is quite effective to improve the control performance when controlling both the position and velocity of the control object 1. Therefore, in the FIG. 1 digital servo control system, the disturbance/velocity observer 53 calculates an estimated velocity to produce a corresponding signal S53b based on the absolute position signal S2 from the position detector and the drive command signal S52 indicative of a drive current applied to the servo motor 3 or actuator through the driving circuit 4. The estimated velocity signal S53b is fed back to the positional control processing unit 51. The detailed description will be given later for the calculation algorithm of the estimated disturbance torque signal S53a and the estimated velocity signal S53b.

In this embodiment, the positional control processing unit 51 is constructed to carry out regular PID control processing so as to compute a velocity command by subtracting the absolute position signal S2 from a position command REF or a control command indicative of a target position, and further to add the estimated velocity signal S53b to produce a drive torque command signal S51. This drive torque command signal S51 is added at the signal adder 52 to the estimated disturbance torque signal S53a to thereby produce the drive command signal S52 which is applied to the drive circuit 4. The drive circuit 4 operates in response to the drive command signal S52 to produce a drive signal effective to drive the actuator or servo motor 3 to finally drive the control object 1.

The initial state value calculating unit 54 is operated when starting the servo control system so as to calculate, based on the absolute position signal S2, initial values for the state variables which are estimated by the observer 53 and which are given in the form of the estimated disturbance torque signal S53a and the estimated velocity signal S53b. Accordingly, even when the control object 1 has been stopped in a given position, the initial state value calculating unit 54 calculates the initial value of the state variables associated with the stop position of the control object 1. The observer 53 estimates subsequent state values using the initial state values applied thereto from the initial state value calculating unit 54.

Hereinafter, the detailed description is given for processing in the disturbance/velocity observer 53 and in the initial state value calculating unit 54. As described above, the disturbance/velocity observer 53 receives the drive command signal S52 which is inputted into the driving circuit 4 to ultimately control the control object 1 and the position signal S2 which is outputted from the position detector 2 in accordance with the control object 1, so as to observe or estimate a disturbance load 7 applied to the control object 1 and a kinetic velocity of the control object 1.

The drive torque Tm applied to the control object 1 is represented by the following equation (1):

$$Tm = J\dot{\theta} + T_L \quad (1)$$

where J denotes a nominal inertia of the control object 1, $\theta$ denotes a rotational angular position of the control object which is represented by the position signal S2, and $T_L$ denotes a disturbance torque which represents a magnitude of the disturbance load 7 in this embodiment.

Next, a state vector $x = (x_1, x_2, x_3)$, an input u and an output y are defined by the following relations (2):

$$\left. \begin{array}{rcl} x_1 & = & \theta \\ x_2 & = & \dot{\theta} \\ x_3 & = & T_L \\ u & = & Tm \\ y & = & x_1 = \theta \\ \dot{T}_L & = & 0 \end{array} \right\} \quad (2)$$

Then, the state equations (3) and (4) are obtained as follows:

$$\dot{x} = Ax + Bu \quad (3)$$

$$y = Cx \quad (4)$$

where A denotes a coefficient vector, B denotes an input vector, and C denotes an output vector.

The coefficient vector A, input vector B and output vector C are set to the following data so that the state equations (3) and (4) are rewritten in the vector and matrix form of the following equations (5) and (6):

$$\begin{bmatrix} \dot{x}_1 \\ \dot{x}_2 \\ \dot{x}_3 \end{bmatrix} = \begin{bmatrix} 0 & 1 & 0 \\ 0 & 0 & 1/J \\ 0 & 0 & 0 \end{bmatrix} \begin{bmatrix} x_1 \\ x_2 \\ x_3 \end{bmatrix} + \begin{bmatrix} 0 \\ 1/J \\ 0 \end{bmatrix} u \quad (5)$$

$$y = [1\ 0\ 0] \begin{bmatrix} x_1 \\ x_2 \\ x_3 \end{bmatrix} \quad (6)$$

As described above, the digital servo control device 5 is composed of a microcomputer. Therefore, the state equations (5) and (6) are subjected to digital processing each sampling period. Therefore, the state equations (5) and (6) are transformed according to the algorithm of the digital computation processing based on the sampling method into the following differential equations (7) and (8):

$$x(k+1) = \tilde{A}.x(k) + \tilde{B}.u(k) \quad (7)$$

$$y(k) = \tilde{C}.x(k) \quad (8)$$

where k denotes a sampling number and takes integers 0, 1, 2, . . . .

The differential representations $\tilde{A}$, $\tilde{B}$ and $\tilde{C}$ of the vectors A, B and C are given in the form of the following equations (9):

$$\left. \begin{array}{rcl} \tilde{A} & = & \exp(AT) \\ \tilde{B} & = & \int_0^T \exp(AT) dt \\ \tilde{C} & = & C \end{array} \right\} \quad (9)$$

where T denotes a sampling period and t denotes a sampling time defined by $t = kT$.

Accordingly, in order to carry out the digital computation each sampling period, the state equations (7) and (8) are represented in the following detailed forms of the state equations (10) and (11):

$$\begin{bmatrix} x_1(k+1) \\ x_2(k+1) \\ x_3(k+1) \end{bmatrix} = \begin{bmatrix} 1 & T & -T^2/2J \\ 0 & 1 & -T/J \\ 0 & 0 & 1 \end{bmatrix} \begin{bmatrix} x_1(k) \\ x_2(k) \\ x_3(k) \end{bmatrix} + \begin{bmatrix} T^2/2J \\ T/J \\ 0 \end{bmatrix} u(k) \quad (10)$$

$$y(k) = [1\ 0\ 0] \begin{bmatrix} x_1(k) \\ x_2(k) \\ x_3(k) \end{bmatrix} \quad (11)$$

The observer 53 is constructed according to Gopinath's design rule which is disclosed, for example, in "Basic Digital Control", Mido et al., Corona Co., Ltd., page 79. The Gopinath's design rule is applied to the equations (10) and (11) to produce a minimal order observer which is represented by the following equation (12):

$$\begin{bmatrix} z_1(k+1) \\ z_2(k+1) \end{bmatrix} = \begin{bmatrix} a_{11} & a_{12} \\ a_{21} & a_{22} \end{bmatrix} \begin{bmatrix} z_1(k) \\ z_2(k) \end{bmatrix} + \begin{bmatrix} b_{11} & b_{12} \\ b_{21} & b_{22} \end{bmatrix} \begin{bmatrix} y(k) \\ u(k) \end{bmatrix} \quad (12)$$

where the respective coefficients are represented as follows:

$$\left. \begin{aligned} a_{11} &= 1 - L_1 T \\ a_{12} &= -T/J - L_1 T^2/2J \\ a_{21} &= -L_2 T \\ a_{22} &= -L_2 T^2/2J \\ b_{11} &= -L_1^2 T - L_2 T/J - L_1 L_2 T^2/2 \\ b_{12} &= T/J - L_1 T^2/2J \\ b_{21} &= L_2^2 T^2/2J - L_1 L_2 T \\ b_{22} &= -L_2 T^2/2J \end{aligned} \right\} \quad (13)$$

There is also obtained the following equation (14):

$$\begin{bmatrix} \hat{x}_1(k) \\ \hat{x}_2(k) \\ \hat{x}_3(k) \end{bmatrix} = \begin{bmatrix} 0 & 0 \\ 1 & 0 \\ 0 & 1 \end{bmatrix} \begin{bmatrix} z_1(k) \\ z_2(k) \end{bmatrix} + \begin{bmatrix} 0 & 0 \\ L_1 & 0 \\ L_2 & 0 \end{bmatrix} \begin{bmatrix} y_1(k) \\ y_2(k) \end{bmatrix} \quad (14)$$

where $x_1(k)$, $x_2(k)$ and $x_3(k)$ denotes respective estimated values, and $L_1$ and $L_2$ are represented by the following equations (15):

$$\left. \begin{aligned} L_1 &= (-\alpha - \beta - \alpha\beta + 3)/2T \\ L_2 &= (-\alpha - \beta + \alpha\beta + 1)/(-T^2/J) \end{aligned} \right\} \quad (15)$$

where $\alpha$ and $\beta$ denotes poles of the observer.

For simplicity, equation (12) is transformed in the form of one sample preceding representation (namely, k is simply shifted to K−1 without losing generality of the equation, to thereby use the following equation (16):

$$\begin{bmatrix} z_1(k) \\ z_2(k) \end{bmatrix} = \begin{bmatrix} a_{11} & a_{12} \\ a_{21} & a_{22} \end{bmatrix} \begin{bmatrix} z_1(k-1) \\ z_2(k-1) \end{bmatrix} + \begin{bmatrix} b_{11} & b_{12} \\ b_{21} & b_{22} \end{bmatrix} \begin{bmatrix} y(k-1) \\ u(k-1) \end{bmatrix} \quad (16)$$

Namely, the disturbance/velocity observer 53 executes the algorithm of the state equation (16). In the equation (16), k takes on an initial value of 1. Thereafter, k is incremented to 2, 3, . . . each sampling period. The disturbance/velocity observer 53 uses the values $z_1(k-1)$, $z_2(k-1)$, $y(k-1)$ and $u(k-1)$ obtained at the preceding sampling period so as to produce the instant state values $z_1(k)$ and $z_2(k)$ for the current sampling period. In this embodiment, the state value $z_1(k)$ corresponds to the estimated disturbance torque signal S53a, and the other state value $z_2(k)$ corresponds to the estimated velocity signal S53b.

When the control object 1 is placed in the origin position, the initial value of the output variable y is given at the start of the operation in the form of $y(k-1)=y(0)=\theta(0)$, where k is set to 1 at the first period. Further, since the control object 1 is normally placed under a nonexcited condition in the initial state, the initial value of the input variable u is set to $u(k-1)=u(0)=0$. In a similar manner, the initial state values are set as follows: $z_1(k-1)=z_1(0)=0$ and $z_2(k-1)=z_2(0)=0$.

On the other hand, when the control object 1 is placed away from the origin position, the state values at the first sampling period are calculated according to the equation (16) as follows: $z_1(k)=z_1(1)$ and $z_2(k)=z_2(1)$. In such a case, if the initial state values $z_1(0)=0$ and $z_2(0)=0$ at the start of operation, and the succeeding state values $z_1(1)$ and $z_2(1)$ after one sampling period are deviated considerably from each other, the disturbance/velocity observer 53 has a specific converging performance effective to null differences from the initial state values so that the observer 53 repeatedly carries out the estimation or observation every sampling period to thereby achieve convergence at some rate according to a magnitude of the pole of the disturbance/velocity observer 53. However, if the control object 1 were to be driven while a considerable difference or error exists, an excessive input force would be applied to the control object 1, thereby causing disorder or vibration of the control object 1.

In view of this, the initial state value calculating unit 54 calculates the estimated state values $x_1(1)$ and $x_2(1)$ of the equation (14) according to a stop position (inclusive of the origin position) of the control object 1 at the start of the operation so as to eliminate the above mentioned error even if the control object 1 has been stopped away from the origin position.

A detailed description will now be given for the processing of the initial state value calculating unit 54. When the absolute position $\theta$ (value of the position signal S2) detected by the position detector 2 in the initial state is given as $\theta(0)=0$, it follows that $y(k-1)=y(0)=\theta(0)$. Since the servo control device 5 normally does not excite the control object 1 at the initial stage of the operation, the output after one sampling period can be approximated by the following relation: $y(k)=y(1)=\theta(0)$. From the equation (14), the first estimated value $\hat{x}_1(1)$, i.e., the estimated value of the position in this embodiment is obtained as follows: $\hat{x}_1(1)=y(1)=\theta(0)$.

At this time, the second and third estimated values $\hat{x}_2(1)$ and $\hat{x}_3(1)$, i.e., the estimated velocity (signal S53$b$) and the estimated disturbance torque (signal S53$a$) are set as follows:

$$\left.\begin{array}{l}\hat{x}_2(1) = 0 \\ \hat{x}_2(1) = 0\end{array}\right\} \quad (17)$$

The above equations (17) are introduced into the equation (14) to thereby obtain the following equations (18):

$$\left.\begin{array}{l}z_1(k) = -L_1 y(0) \\ z_2(k) = -L_2 y(0)\end{array}\right\} \quad (18)$$

From these equations (18), the state values for the disturbance/velocity observer 53 are obtained as follows: $z_1(k)=z_1(1)$ and $z_2(k)=z_2(1)$.

When setting the sampling number k=1 in the equation (16) at the initial sampling period, there is obtained the following equation (19):

$$\begin{bmatrix}z_1(1) \\ z_2(1)\end{bmatrix} = \begin{bmatrix}a_{11} & a_{12} \\ a_{21} & a_{22}\end{bmatrix}\begin{bmatrix}z_1(0) \\ z_2(0)\end{bmatrix} + \begin{bmatrix}b_{11} & b_{12} \\ b_{21} & b_{22}\end{bmatrix}\begin{bmatrix}y(0) \\ u(0)\end{bmatrix} \quad (19)$$

Then, the initial value of the input is defined as follows:

$$u(0)=0 \quad (20)$$

From the equation (13), there is obtained the following relation:

$$\begin{bmatrix}a_{11} & a_{12} \\ a_{21} & a_{22}\end{bmatrix} \neq 0 \quad (21)$$

From these, the initial state values of the disturbance/velocity observer 53 are represented by the following equation (22):

$$\begin{bmatrix}z_1(0) \\ z_2(0)\end{bmatrix} = \begin{bmatrix}a_{11} & a_{12} \\ a_{21} & a_{22}\end{bmatrix}^{-1}\begin{bmatrix}-L_1 & -b_{11} \\ -L_2 & -b_{21}\end{bmatrix} \quad (22)$$

The initial state value calculating unit 54 calculates the above initial state values at the start of the operation, and feeds the same to the observer 53. The observer 53 calculates the state values using the above mentioned initial state values.

Figure 2:
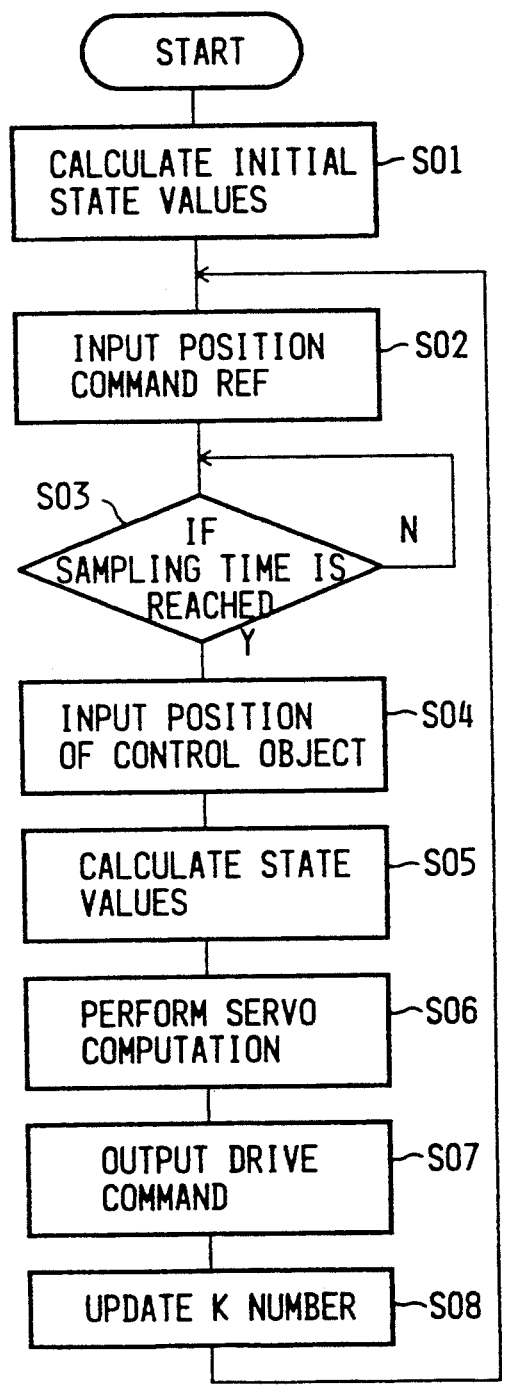
FIG. 2 is a process flow chart of the FIG. 1 servo control system.

FIG. 2 is a processing flow chart of the FIG. 1 servo control device 5 which executes the above described algorithm. Hereinafter, the detailed description is given for each of the steps S01–S08 involved in the FIG. 2 flow chart.

STEP 01

When starting the microcomputer which constitutes the servo control device 5, or when starting the servo control system, first the initial state value calculating unit 54 is activated to calculate the initial state values for the disturbance/velocity observer with respect to the present stop position of the control object according to the above described algorithm. These initial state values are stored in a memory (not shown) within the servo control device 5. Then, the following steps 02–08 are repeatedly carried out to undertake the given processing operation each sampling period.

STEP 02

The servo control device 5 inputs a position or control command REF indicative of a target position. This position command REF is generated according to a given schedule of the control object 1 by a position command generating algorithm memorized in the microcomputer which constitutes the servo control device 5.

STEP 03

Judgement is made as to whether a sampling time is reached or not. Processing is suspended as long as the given sampling time is not reached. When the sampling time is reached, the below control processing is executed. By such sampling period regulation, the servo control device 5 carries out the following feedback control of the sampling mode based on the predetermined constant sampling period.

STEP 04

A digital input device (not shown) within the servo control device 5 receives from the position detector 2 of the absolute type encoder the absolute position signal S2 indicative of the absolute position of the control object 1, i.e., the rotation angle of the control object 1 in this embodiment, and stores the absolute position data in an installed memory. The absolute position signal S2 memorized in the memory is utilized in the disturbance/velocity observer 53 and the position control processing unit 51.

STEP 05

The disturbance/velocity observer 53 calculates state values in the form of the estimated disturbance torque signal S53$a$ and the estimated velocity signal S53$b$ based on the absolute position signal S2 and the drive command signal S52. At the first sampling period immediately after the start of operation of the servo control system, the disturbance/velocity observer 53 calculates the estimated disturbance torque signal S53$a$ and the estimated velocity signal S53$b$ using the initial state values calculated by the initial state value calculating unit 54. At the second and subsequent sampling periods, the disturbance/velocity observer 53 calculates the estimated disturbance torque signal S53$a$ and the estimated velocity signal S53$b$ by applying sequentially the equations (14) and (16).

STEPS 06, 07

The position control processing unit 51 produces the drive torque command signal S51 based on the absolute position signal S2, and the estimated velocity signal S53$b$ from the disturbance/velocity observer 53. The signal adder 52 adds the drive torque command signal S51 and the estimated disturbance torque signal S53$a$ together to produce the drive command signal S52. By this arrangement, the servo motor drive circuit 4 is supplied with the drive command signal S52 to drive or rotate the driving means in the form of the servo motor 3 to actuate the control object 1 in the form of an articulate arm of the industrial robot system.

STEP 08

The sampling period number k is updated in the disturbance/velocity observer 53 in order to compute the state equations (14) and (16) in the next sampling period.

As described above, the initial state value calculating unit 54 calculates the initial state values for the observer state value calculation, determined with respect to the stop position of the control object 1 which has been stopped at a given position. Accordingly, the disturbance/velocity observer 53 can always calculate the state values effective to carry out smooth and efficient control of the object 1 anywhere the object 1 is placed. Consequently, the control object 1 is driven smoothly from any given stop position without generating vibration and shock. The initial state value calculating unit 54 works only to carry out the above noted process just after the start of operation, thereby avoiding an increase in processing time of the periodic operation (steps 02-08). The FIG. 1 servo control system is provided with the disturbance/velocity observer 53 to produce the estimated disturbance torque signal S53a effective to improve controllability of the control object 1. Further, the FIG. 1 servo control system is provided with the velocity control loop effective to improve the control performance.

Next, description is given for the digital processing of the state values by the disturbance/velocity observer 53 in connection with the above mentioned second object of the invention. The state equation (16) is processed by product and summation operation of the state values $z_1$ and $z_2$ at a sampling time $t=kT$ and by the digitalized control values represented by the equations (10) and (11). The other equation (14) is also processed in a similar manner to obtain the estimated values.

With regard to the sequence of processing in the above mentioned computation procedure, the equation (14) might be processed first, and then the equation (16) might be processed. In such a case, after calculating the estimated values $x_1(k)$, $x_2(k)$ and $x_3(k)$ using the state values $z_1(k)$ and $z_2(k)$ at the sampling period k in the equation (14), the state values $z_1(k)$ and $z_2(k)$ might be calculated at the sampling period k using the state values $z_1(k-1)$, $z_2(k-1)$, output $y(k-1)$ and input $u(k-1)$ of the equation (16) at the preceding sampling period $k-1$, thereby causing logical contradiction. Thus, such computation procedure of the algorithm could not be realized.

Accordingly, it is necessary to execute the calculation of the equation (16) first and then to execute the calculation of the equation (14). For this, the disturbance/velocity observer 53 is constructed to execute the calculation of the equation (16) precedingly to produce the state values $z_1(k)$ and $z_2(k)$ for the next sampling period, and then to calculate the estimated values $\hat{x}_1(k)$, $\hat{x}_2(k)$ and $\hat{x}_3(k)$ of the equation (14) at the next sampling period using the calculated state values $z_1(k)$ and $z_2(k)$. Namely, the disturbance/velocity observer 53 is divided into a state value calculating unit of the equation (16) and an estimated value calculating unit of the equation (14). These separate units are operated at different sampling periods.

Figure 3:
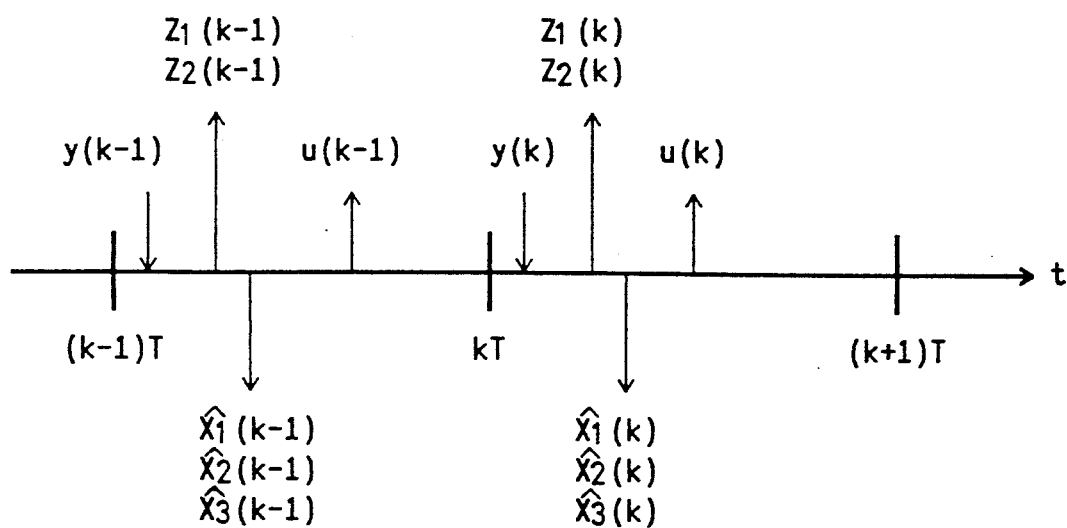
FIG. 3 is a process timing chart of a disturbance and velocity observer provided in the embodiment according to the present invention.
Figure 4:
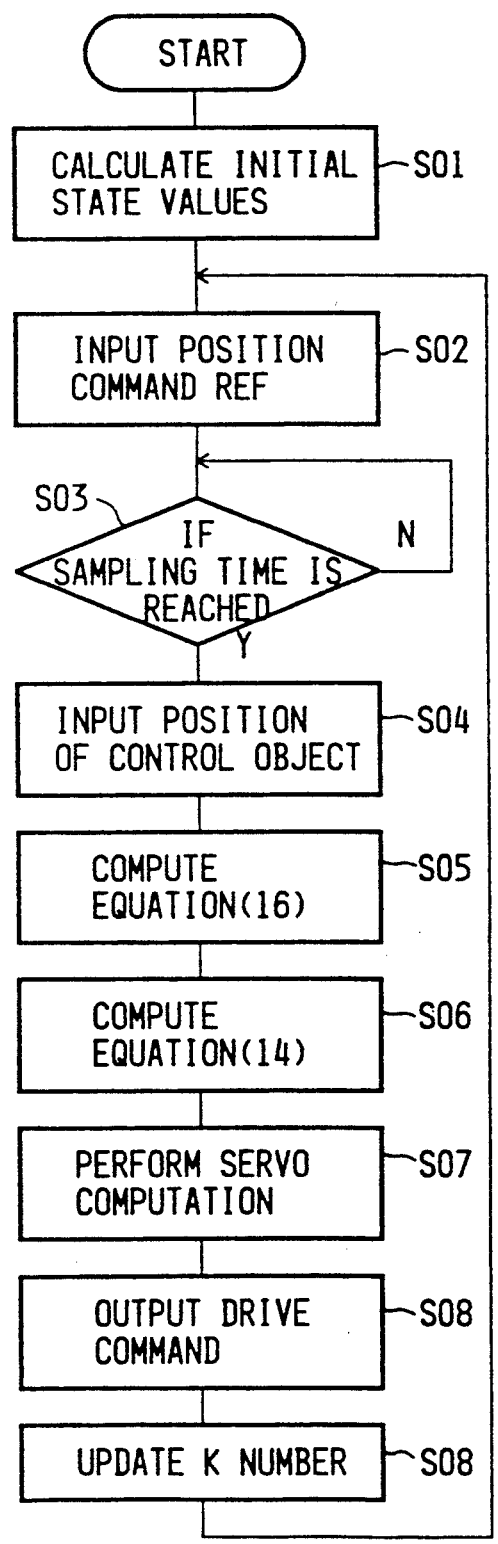
FIG. 4 is a flow chart related to the FIG. 3 timing chart.

FIG. 3 is an operating timing chart, and FIG. 4 is a processing flow chart, the FIG. 1 digital servo control device 5 which executes the above noted control algorithm. Hereinafter, detailed description is given for each of the steps 01-09 of the FIG. 4 flow chart in conjunction with the FIG. 3 timing chart.

STEP 01

When starting the microcomputer which constitutes the digital servo control device 5, or when starting the servo control system, first the initial state value calculating unit 54 is activated to calculate the initial state values for the disturbance/velocity observer with respect to the last stop position of the control object according to the above described algorithm. These initial state values are stored in a memory (not shown) within the servo control device 5. Then, the following steps 02-09 are repeatedly carried out to undertake the given processing operation each sampling period.

STEP 02

The servo control device 5 inputs a position command REF indicative of a target position. This position command REF is generated according to a given schedule of the control object 1 by a position command generating algorithm memorized in the microcomputer which constitutes the servo control device 5.

STEP 03

Judgement is made as to whether a sampling time is reached or not. Processing is suspended as long as the given sampling time is not reached. When the sampling time is reached, the below control processing is executed. By such sampling period regulation, the servo control device 5 carries out the following feedback control of the sampling mode based on the predetermined constant sampling period.

STEP 04

A digital input device (not shown) within the servo control device 5 receives from the position detector 2 of the absolute type encoder the absolute position signal S2 indicative of the absolute position of the control object 1, i.e., the rotation angle of the control object 1 in this embodiment, and stores the absolute position data in an installed memory. The absolute position signal S2 memorized in the memory is utilized in the disturbance/velocity observer 53 and the position control processing unit 51.

STEP 05

The state value calculating unit of the disturbance/velocity observer 53 operates based on the equation (16) to calculate state values $z_1(k)$ and $z_2(k)$ for use at a next sampling period k, according to state values $z_1(k-1)$, $z_2(k-1)$, output $y(k-1)$ and input $u(k-1)$ at an instant sampling period $k-1$.

STEP 06

The estimated value calculating unit of the disturbance/velocity observer 53 is operated to calculate the estimated values $\hat{x}_1(k)$, $\hat{x}_2(k)$ and $\hat{x}_3(k)$ of an instant sampling period k according to the equation (14), using the output value $y(k)$ and the state values $z_1(k)$, $z_2(k)$ which have been calculated by the state value calculating unit related to the equation (16) and have been stored in a memory.

In addition, at the first sampling period just after the start of operation, the observer 53 produces the estimated disturbance torque signal S53a and the estimated velocity signal S53b, using the initial state values calculated by the initial state value calculating unit 54. At the second and subsequent sampling periods, the observer 53 sequentially applies the equations (14) and (16) to produce the estimated disturbance torque signal S53a and the estimated velocity signal S53b.

STEPS 07, 08

The position control processing unit 51 produces the drive torque command signal S51 based on the absolute position signal S2, and the estimated velocity signal S53b from the disturbance/velocity observer 53. At this time, the position control processing unit 51 utilizes the state value of the current sampling period. The signal adder 52 adds the drive torque command signal S51 and the estimated disturbance torque signal S53a together to produce the drive command signal S52. By this arrangement, the servo motor drive circuit 4 is supplied with the drive command signal S52 to drive or rotate the servo motor 3 to actuate the control object 1 in the form of an articulate arm of the industrial robot system.

STEP 09

The sampling period number k is updated in the disturbance/velocity observer 53 in order to compute the state equations (14) and (16) in the next sampling period.

As described above, the initial state value calculating unit 54 calculates the initial state values for the subsequent state value calculation determined with respect to the stop position of the control object 1 which has been placed at a given position. Accordingly, the disturbance/velocity observer 53 can always calculate the state values effective to carry out smooth and efficient control of the object 1 anywhere the object 1 is placed. Consequently, the control object 1 is driven smoothly from any given stop position without generating vibration and shock. The initial state value calculating unit 54 works only to carry out the above noted process just after the start of operation, thereby avoiding an increase in processing time of the periodic operation (steps 02-09).

Further, there is provided the velocity control loop operative to carry out velocity control using the accurately estimated velocity by the disturbance/velocity observer 53 to thereby improve the controllability. Moreover, the observer 53 is constructed to execute processing in a manner suitable to the sampling mode.

Figure 5:
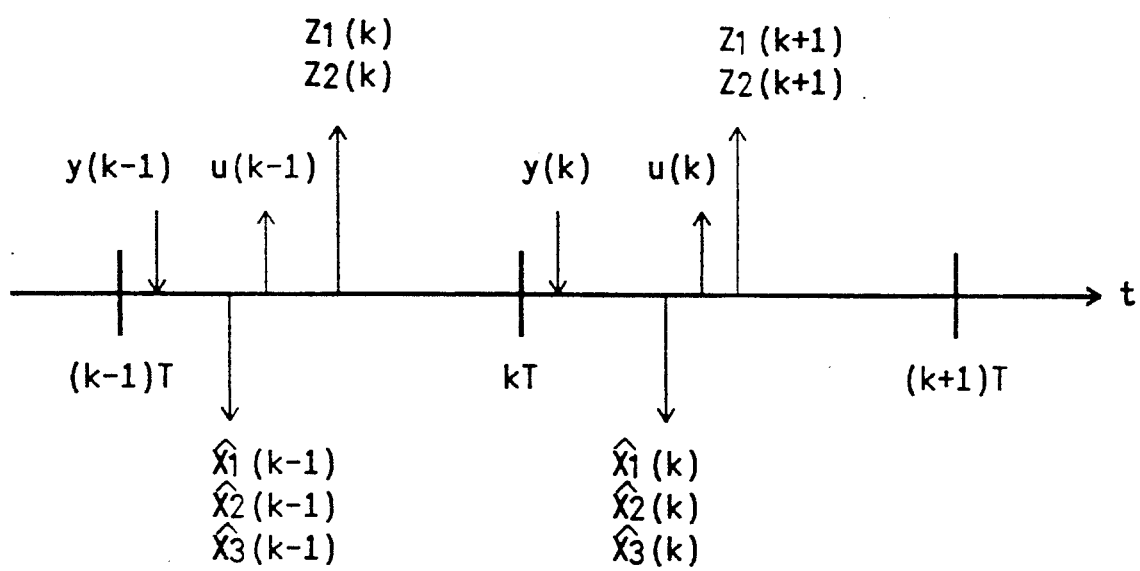
FIG. 5 is a process timing chart of a disturbance and velocity observer provided in another embodiment according to the invention.

In the embodiment described in conjunction with FIGS. 3 and 4, the observer 53 is divided into one portion which processes based on the equation (14) and another portion which processes based on the equation (16). Such separate processing may not be preferable in some cases. In view of this, a more preferable method will be described in conjunction with another process timing chart of FIG. 5, which is a modified form of the FIG. 3 case. As shown in the figure, the state values $z_1(k)$ and $z_2(k)$ are calculated at the sampling period kT using the input $u(k-1)$, output $y(k-1)$ and the state values $z_1(k-1)$ and $z_2(k-1)$, which have been provided at the preceding sampling period $k-1$. Further, in the same sampling period, the estimated values $\hat{x}_1(k)$, $\hat{x}_2(k)$ and $\hat{x}_3(k)$ are obtained using the output $y(k)$, input $u(k)$ and the state values $z_1(k)$ and $z_2(k)$ calculated as described above.

By such operation, the state values and the estimated values are obtained within the same sampling period, thereby advantageously avoiding separation or division of the computation processing. For this purpose, in the computation processing described with reference to FIG. 4, for example, the computation of the equation (16) at the step 05 and the computation of the equation (14) at the step 06 are simultaneously executed in the same step, for example, in the step 05.

The above described embodiments are directed to angular control related to the robot arm drive in the industrial robot system. However, the present invention can be applied to various modifications of the systems. For example, the positional control calculating unit 51 carries out the PID control computation in the present embodiment; however, other control computations such as IPD can be adopted instead of PID. Further, the positional control processing unit 51 may output various commands according to its control algorithm in addition to the velocity command.

In this embodiment, the servo control device 5 is composed entirely of a microcomputer or microprocessor; however, the servo control device may be comprised of a hardware circuit and a microcomputer in a hybrid system structure.

Further, the position detector 2 is not limited to the absolute type encoder, but may be comprised in combination of an incremental type encoder and a counter circuit. In addition, the invention is applied not only to the angular control of the object 1, but also to the linear position control. Moreover, the invention can be applied not only to the industrial robot system, but also to other various types of servo control systems such as a machining system. Generally, the present invention can be applied to the various types of digital servo control systems utilizing an observer represented by two kinds of equations (algorithms) such as the equations (14) and (16) in the described embodiments.

As described above, according to the invention, the system is constructed to carry out processing in a manner suitable to the sampling mode operation, thereby providing an improved observer which executes the digital processing efficiently. Further, according to the invention, there is provided the initial state value calculating means for feeding the initial state values utilized in state value computation in the state where the control object is stopped at a given position, e.g., where the angular position has possibly deviated from the origin position, thereby enabling smooth control or drive of the object to the target position from the stop position, which may be deviated from the origin position. Moreover, according to the invention, the estimated velocity is utilized for the velocity control to thereby improve the controllability. In addition, by providing the initial state value calculating means for feeding initial state values needed to calculate the subsequent state values under the condition in which the control object is stopped at an arbitrary position, the control object can be driven smoothly and safely to the target position from the initial stop position.

What is claimed is:

1. A servo control system comprising: detecting means for detecting an absolute position of a control object; means for driving the control object according to a drive command applied thereto; an observer for estimating a state value based on detected results from the detecting means and the drive command; servo control means operative according to a control command indicative of a target position, the detected absolute position and the estimated state value to calculate the drive command effective to enable the driving means to drive the control object to the target position; and calculating means operative when starting the servo control system for calculating an initial state value for use in the observer according to an initial position of the control object.

2. A servo control system comprising: detecting means for detecting a position of a control object; driving means for driving the control object according to a drive command applied thereto; an observer operative based on the detected position from the detecting means and the drive command for performing digital processing to calculate state values in the form of an estimated velocity and an estimated disturbance; and servo control means operative based on a given target position, the detected position of the control object, the estimated velocity and the estimated disturbance to calculate the drive command effective to enable the driving means to drive the control object to the target position, wherein the observer includes an estimated value calculating unit and a state value calculating unit, responsive to a sampling period and operative based on an algorithm of a preceding sampling, so that the observer calculates the state values and the estimated values in each sampling period.

* * * * *